(12) United States Patent
Seo et al.

(10) Patent No.: US 11,775,831 B2
(45) Date of Patent: Oct. 3, 2023

(54) CASCADED COMPUTING FOR CONVOLUTIONAL NEURAL NETWORKS

(71) Applicants: Jae-sun Seo, Tempe, AZ (US); Minkyu Kim, Chandler, AZ (US)

(72) Inventors: Jae-sun Seo, Tempe, AZ (US); Minkyu Kim, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/154,727

(22) Filed: Jan. 13, 2023

(65) Prior Publication Data

US 2023/0222339 A1 Jul. 13, 2023

Related U.S. Application Data

(63) Continuation of application No. 16/335,775, filed as application No. PCT/US2017/052736 on Sep. 21, 2017, now Pat. No. 11,556,779.

(Continued)

(51) Int. Cl.
*G06N 3/08* (2023.01)
*G06N 3/045* (2023.01)
(Continued)

(52) U.S. Cl.
CPC .............. *G06N 3/08* (2013.01); *G06F 7/48* (2013.01); *G06N 3/045* (2023.01); *G06N 3/0464* (2023.01)

(58) Field of Classification Search
CPC ........... G06F 7/48; G06N 3/0454; G06N 3/08
See application file for complete search history.

(56) References Cited

U.S. PATENT DOCUMENTS 5,822,452 A * 10/1998 Tarolli ............... G06T 9/002
345/582
9,436,895 B1 9/2016 Jones et al.
(Continued)

FOREIGN PATENT DOCUMENTS

WO WO 2016033506 3/2016
WO WO 2017190089 11/2017
WO WO 2018022821 2/2018

OTHER PUBLICATIONS

International Search Report and Written Opinion in International Appln. No. PCT/US2017/052736, dated Jan. 8, 2018, 9 pages.

*Primary Examiner* — Xilin Guo
(74) *Attorney, Agent, or Firm* — Fish & Richardson P.C.

(57) ABSTRACT

Techniques are described for efficiently reducing the amount of total computation in convolutional neural networks (CNNs) without affecting the output result or classification accuracy. Computation redundancy in CNNs is reduced by exploiting the computing nature of the convolution and subsequent pooling (e.g., sub-sampling) operations. In some implementations, the input features may be divided into a group of precision values and the operation(s) may be cascaded. A maximum may be identified (e.g., by 90% probability) using a small number of bits in the input features, and the full-precision convolution may then be performed on the maximum input. Accordingly, the total number of bits used to perform the convolution is reduced without affecting the output features or the final classification accuracy.

11 Claims, 10 Drawing Sheets

Related U.S. Application Data

(60) Provisional application No. 62/399,753, filed on Sep. 26, 2016.

(51) Int. Cl.
    *G06N 3/0464*     (2023.01)
    *G06F 7/48*     (2006.01)

(56) References Cited

U.S. PATENT DOCUMENTS

| | | |
|---|---|---|
| 9,466,362 B2 | 10/2016 | Yu et al. |
| 9,934,463 B2 | 4/2018 | Seo et al. |
| 11,556,779 B2 | 1/2023 | Seo et al. |
| 2015/0032449 A1 | 1/2015 | Sainath et al. |
| 2015/0255062 A1 | 9/2015 | Penn et al. |
| 2015/0339571 A1 | 11/2015 | Krizhevsky et al. |
| 2017/0220929 A1* | 8/2017 | Rozen ................... G06F 7/483 |
| 2017/0300815 A1 | 10/2017 | Seo |
| 2017/0316307 A1* | 11/2017 | Koster ................. G06F 7/5443 |
| 2018/0081632 A1* | 3/2018 | Langhammer ........ G06F 7/5443 |
| 2019/0080755 A1 | 3/2019 | Seo et al. |
| 2019/0087719 A1 | 3/2019 | Seo et al. |
| 2019/0150794 A1 | 5/2019 | Vrudhula et al. |
| 2019/0164538 A1 | 5/2019 | Seo et al. |
| 2019/0244100 A1 | 8/2019 | Seo et al. |

* cited by examiner

CASCADED COMPUTING FOR CONVOLUTIONAL NEURAL NETWORKS

CROSS-REFERENCE TO RELATED APPLICATIONS

The present application is a continuation of U.S. patent application Ser. No. 16/335,775, titled "Cascaded Computing For Convolutional Neural Networks" filed on Mar. 22, 2019, which is a U.S. National Stage Application under 35 USC § 371 and claims the benefit of International Patent Application No. PCT/US2017/052736 titled "Cascaded Computing for Convolutional Neural Networks," filed on Sep. 21, 2017, which is related to, and claims priority to, U.S. Provisional Patent Application Ser. No. 62/399,753, titled "Cascaded Computing for Convolutional Neural Networks," filed on Sep. 26, 2016, all of which are incorporated herein by reference in their entirety.

BACKGROUND

Convolutional Neural Networks (CNNs) have gained popularity in many computer vision applications (image, video, speech, etc.), because of their ability to train and classify with high accuracy. Due to multiple layers of convolution and pooling operations that are compute-/memory-intensive, it is difficult to perform real-time classification with low power consumption on today's computing systems.

SUMMARY

Implementations of the present disclosure are generally directed to a technique for efficiently reducing the amount of total computation in CNNs without affecting the output result or classification accuracy.

In general, innovative aspects of the subject matter described in this specification can be embodied in methods that include actions of: in one or more layers of a convolutional neural network (CNN), performing a first iteration that includes computing a value based on a first set of most significant bits (MSBs) for each of a plurality of data sets; examining a first set of values computed for the plurality of data sets in the first iteration to determine whether a maximum value is present among the first set of values; responsive to identifying the maximum value, performing a full precision computation of the value for a data set, of the plurality of data sets, that exhibited the maximum value; and propagating the full precision computation of the value to a subsequent layer of the CNN.

Implementations can optionally include one or more of the following features: the actions further include, responsive to determining that the first set of values are the same, performing a second iteration that includes computing the value based on a second set of MSBs for each of the plurality of data sets, the second set of MSBs being larger than the first set of MSBs; the actions further include examining a second set of values computed for the plurality of data sets in the second iteration to determine whether the maximum value is present among the second set of values; the actions further include, responsive to identifying the maximum value among the second set of values, performing the full precision computation of the value for a data set, of the plurality of data sets, that exhibited the maximum value in the second iteration; the computing in each of the first iteration and the second iteration employs a convolution and a pooling; the convolution is a N×N convolution, where N is any integer; the pooling is a N×N pooling, where N is any integer; the convolution is a 3×3 convolution, and the pooling is a 2×2 pooling; at least one of the first iteration and the second iteration is performed with a precision less than that of the full precision computation; the precision is 8-bit precision; the CNN is employed to analyze an image; the first iteration computes a value that approximates the full precision computation of the value; and/or the full precision computation is performed on the data set the includes less data than the plurality of data sets.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and/or computer-readable media for efficiently reducing the amount of total computation in CNNs without affecting the output result or classification accuracy. CNNs are traditionally computationally and memory intensive, and may consume a large amount of computing resources such as active memory, processing capacity, and so forth, and may involve many redundant operations. Implementations identify the redundant operations at an early stage in processing, and avoid performing the redundant operations for which the results may not be employed subsequently in the analysis, and which therefore may not affect the overall outcome of the analysis. Accordingly, implementations may be particularly advantageous on computing devices which have limiting processing capacity, limited power available, limited active memory, and/or otherwise limited available resources, by avoiding the expenditure of computing resources on redundant operations that may not affect the overall outcome of the analysis.

One of the largest redundancies in conventional CNNs is that a large amount of data is thrown away at each pooling layer, because only the maximum value is conveyed to the next layer. For example, in 2×2 max-pooling, 75% of convolution computation data is thrown away at each pooling layer by only conveying the maximum value to the next layer. In 3×3 max-pooling, 89% of convolution computing data is thrown away at each pooling layer. Implementations avoid such redundancies by performing convolution first with a small number of most significant bits (MSBs), computing the pooling, and if the maximum value is known, performing full-precision convolution on the entry that is the maximum value. If the maximum value is not known based on the small number of MSBs, the process may proceed with lower bits of convolution for multiple entries. The number of bits on which convolution is performed largely affects the critical path delay (e.g., matrix multiplication with a smaller dimension), and may be a design parameter. In this way, implementations perform computation using an amount of data that is close to or at the amount of data that is minimally necessary to perform the computation, without large redundancies. The redundant computations that are present in conventional CNNs are reduced and/or removed by performing a new computation scheme, described herein, that exploits integration of primary computing primitives.

In some implementations, the input bits (e.g., those used in a full-precision computation) may be divided into a number of groups that each include a smaller number of bits (e.g., for low-precision). Starting from the MSB side, implementations may perform approximate computing group-by-group, and these approximate computing steps are cascaded. In some implementations, the same approximate hardware engine may be reused for cascaded precision computing operations, thus reducing the hardware footprint. At each iteration, by finding the maximum value of approximate computations, a decision may be made whether the next approximate convolution iteration needs to be performed. In this way, only the necessary amount of computations may be performed, significantly reducing the amount of total computation compared to traditional methods of iterative computation performed in conventional CNNs. Implementations perform approximate computations of neural networks (e.g., based on the MSBs), make a decision based on the approximate results which data set to proceed with, and then (e.g., only) perform the more fine-grain, full precision, (e.g., more accurate) computations on the narrowed-down set of data that exhibited the maximum. Accordingly, the first iteration computes a value that approximates the full precision computation of the value, and the full precision computation is performed only on the data set that exhibited the maximum, that data set including less data than the entire plurality of data sets.

Figure 1A:
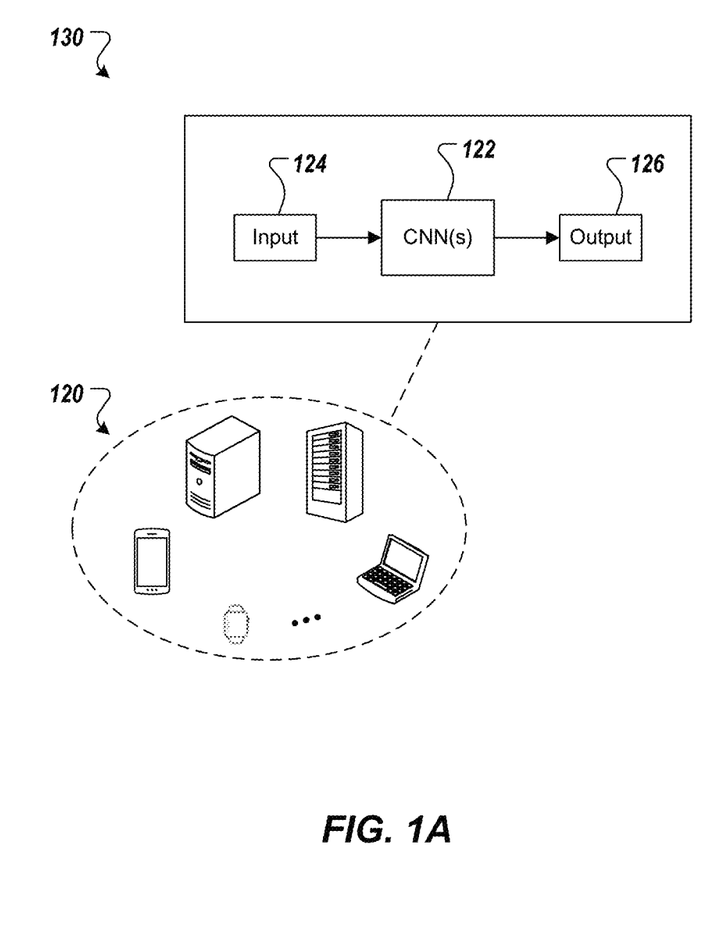
FIG. 1A is a schematic depicting an example of a computing system for cascaded computing for CNNs, according to implementations of the present disclosure.

FIG. 1A is a schematic depicting an example of a computing environment 130 for cascaded computing for CNNs, according to implementations of the present disclosure. As shown in the example of FIG. 1A, the environment 130 includes one or more computing devices 120 of any suitable number and type of computing device. In some implementations, the computing device(s) 120 include small and/or portable device(s), and/or device(s) that have limited hardware capabilities, such as wearable computing devices (e.g., with a wristwatch, headset, glasses, fitness tracker, or other form factor), smart phones, embedded computing devices, devices that are included in automobiles, drones, and/or other vehicles, and so forth. The device(s) 120 may execute one or more CNNs 122 that accept and process input data 124 to generate output data 126. The input and/or output data may be any type of data that is suitable to provide a particular function of the device 120. For example, CNN(s) 122 executing in an autonomous or semi-autonomous vehicle (e.g., a self-driving vehicle) may perform operations related to the navigation and/or operation of the vehicle. In such examples, the CNN(s) may accept input data in the form of current environment data regarding the position and movement of the vehicle relative to any number of proximal objects, and the position and movement of the proximal objects, and generate output data in the form of commands to operate the vehicle, e.g., adjust its position, speed, orientation, and so forth. The greater computational efficiencies provided by the implementations described herein may enable the vehicle to operate with quick response to environmental changes and with computational efficiency and accuracy. Other examples herein describe the use of cascaded computing for CNNs in the context of image analysis.

Implementations are not limited to these examples. The implementations described herein support the deployment of CNNs in a wide variety of applications, such as internet-of-things (IoT) systems, self-driving vehicles, and so forth. Implementations may be especially useful in environments with limited hardware resources, given that implementations enable the hardware footprint and/or processing power to be substantially reduced while producing the same or similar output as conventional CNNs.

Figure 1B:
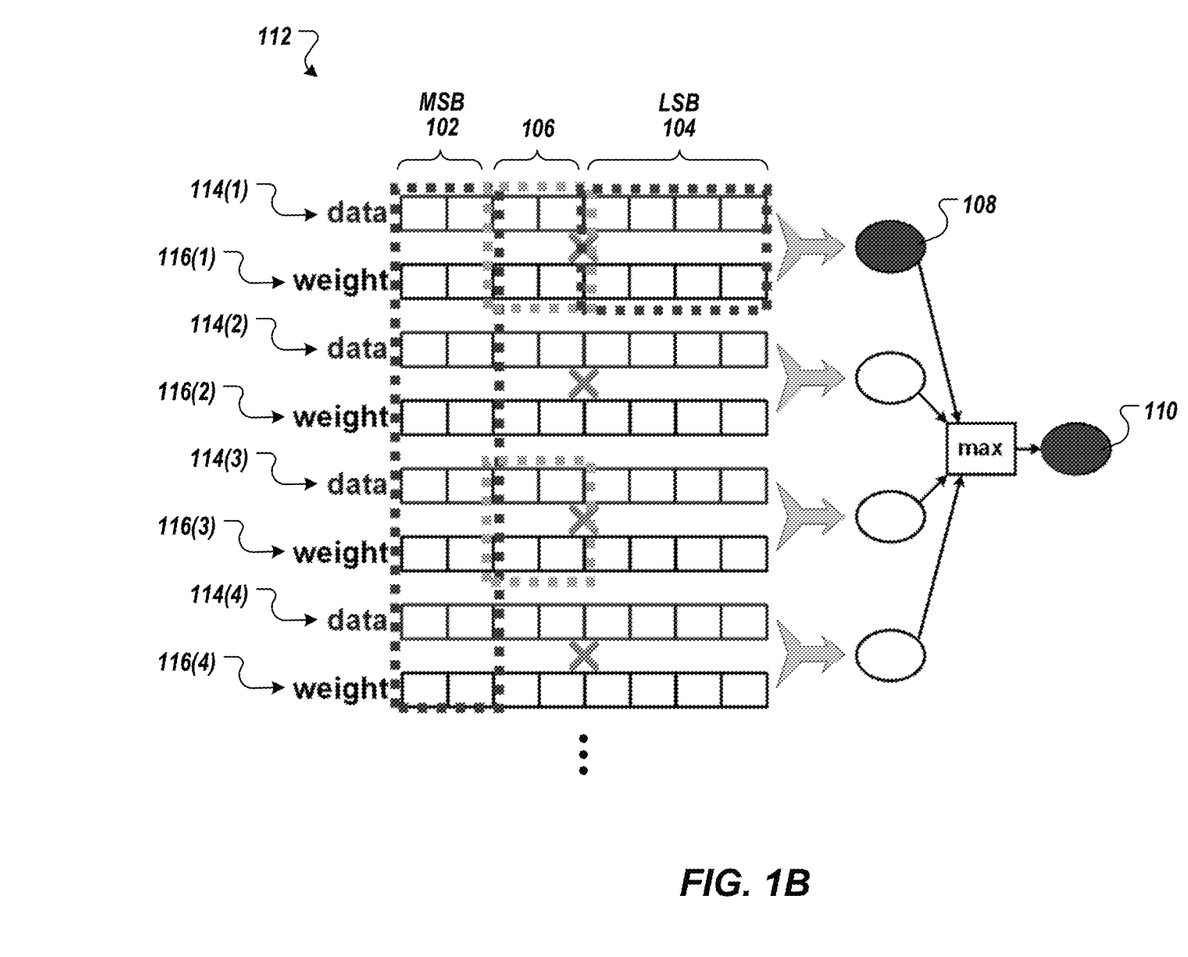
FIG. 1B is a schematic depicting an example of objectives addressed through implementations of the present disclosure.

FIG. 1B is a schematic 112 depicting an example of objectives addressed through implementations of the present disclosure. As shown in the example of FIG. 1B, the objective of at least some implementations is to reduce the redundancy present in dense convolution through use of pooling, e.g., cascaded precision. If the MSB convolution reveals a maximum, LSB convolution may be skipped. Implementations start with coarse computations, and may proceed to more fine-grained computations if necessary.

In the example of FIG. 1B, the analysis is performed on four sets of data 114(1)-114(4) that are each associated with a set of weights 116. Implementations support analysis of any suitable number of data sets and/or weights. In some instances, convolution may include a plurality of multiply and add operations, in which the data and corresponding weight is to be multiplied and the results added to other products of data*weight multiplication in the data set(s). For example, adjacent 2×2 data sets (e.g., pixel sets) may be multiplied to determine individual convolution results for each of the (e.g., four) data sets. From the convolution results for each of the (e.g., four) data sets, a maximum 108 may be determined which is propagated to a next layer of convolution 110. In conventional CNNs, the convolution results that have a lower value than the maximum (e.g., first set of data) may not be used in the next layer(s), e.g., the later stage(s) of the analysis, and may therefore be discarded.

In some implementations, the data may include one or more most significant bits (MSB) 102, one or more least significant bits (LSB) 104, and one or more bits 106 in between the MSB and LSB. MSB may include the coarser level of data and LSB may include the more fine-grained data. In some implementations, convolution may be performed on the MSB initially. Based on the results of the MSB-driven convolution(s), a maximum may be determined. If one of the data sets exhibits a maximum, with a high confidence, over the other data sets based on the MSB-driven convolution(s), the algorithm may proceed to the next layers using that data set maximum and discarding the others. Compared to conventional methods, this MSB-driven convolution may produce similar results given that the lower precision bits in the data set would not have altered the maximum determination computation even if they had been included in the original computation. Accordingly, implementations initially perform a minimal amount of computation to determine and compare maximums among the data sets, and avoid the initial full convolution performed by conventional CNNs. In some implementations, after determining the maximum based on the low precision MSB-based computations, the full precision (e.g., all bits) computation may be performed on the data set for which the maximum was identified.

In some instances, two data sets may exhibit the same value or a similar value following the initial low precision convolution, such that a clear maximum may not be determined among the data sets. In some implementations, if the difference between the initial results is less than a predetermined threshold then a cascaded convolution may be performed by repeating the convolution using a large set of the bits of the data, e.g., the MSB 102 and the intermediary bits 106. A maximum may then be determined from among the results of this computation for each data set. If a clear maximum is not determined based on this slightly higher precision computation, the process may cascade further and perform another iteration with yet more bits, and so forth. The algorithm may perform any suitable number of iterations, up to the full precision (e.g., full data set) convolution, until a maximum is determined from among the data sets. In some implementations, each iteration may include an additional two bits in the computation, compared to the previous iteration. In some implementations, the additional iterations may be performed on those data sets that are candidates to exhibit the eventual maximum, e.g., those data sets for which the result value is close to the result(s) of other data set(s). Accordingly, each iteration may reduce the number of candidate data sets for the eventual maximum value, until only one such data set remains to proceed to the next layer of analysis. This iterative algorithm provided by implementations is also described as a cascading algorithm.

Figure 2:
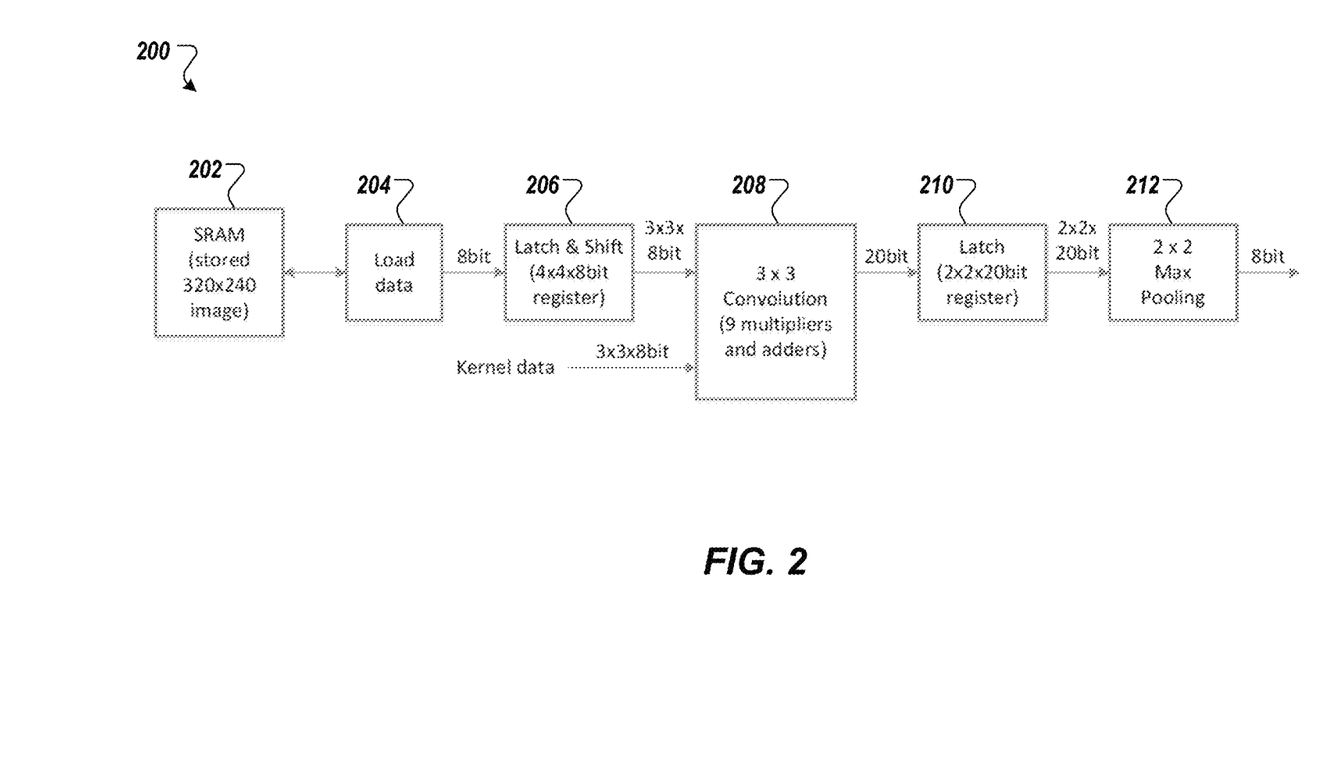
FIG. 2 is a flow diagram depicting an example of a conventional convolution and pooling scheme, according to implementations of the present disclosure.

FIG. 2 is a flow diagram 200 depicting an example of a conventional convolution and pooling scheme. FIG. 2 shows a flow diagram, or block diagram, of a conventional convolution and pooling scheme that employs 3×3 convolution, 2×2 pooling, and 8-bit precision. The scheme of FIG. 2 may proceed according to the convolution equation below, Example Equation 1.

$$= \sum_{n=1}^{M \times N} D_n K_n (D: \text{data}, K: \text{kernel}, M \times N: \text{kernel window size})$$

Example Equation 1

Kernel may refer to the weights described with respect to FIG. 1B. Accordingly, the example equation 1 describes a full precision convolution of all the bits in a particular data set, and/or all the bits that are within a particular M×N window size (e.g., M×N pixel portion(s) of an image). In a conventional method, an image (e.g., 320×240) may be stored (202) in SRAM and the data of the image loaded (204) into registers (206) for processing. Convolution (208) may be performed on the data in the registers, e.g., 3×3 convolution based on 3×3 kernel data (e.g., weighting). The convolution results may be stored in 2×2 bit registers (210), and 2×2 max pooling (212) may be performed to determine the maximum value for the particular layer of analysis before proceeding to the next layer.

Although various examples herein describe applying a particular convolution, pooling, and precision, such as 3×3 convolution, 2×2 pooling, and 8-bit precision, implementations are not so limited. Implementations may employ any N×N convolution, where N is any suitable integer. Implementations may employ any N×N pooling, where N is any suitable integer (different than, or same as, the dimension of the convolution). Implementations may also employ any suitable level of precision in the computation.

Figure 3:
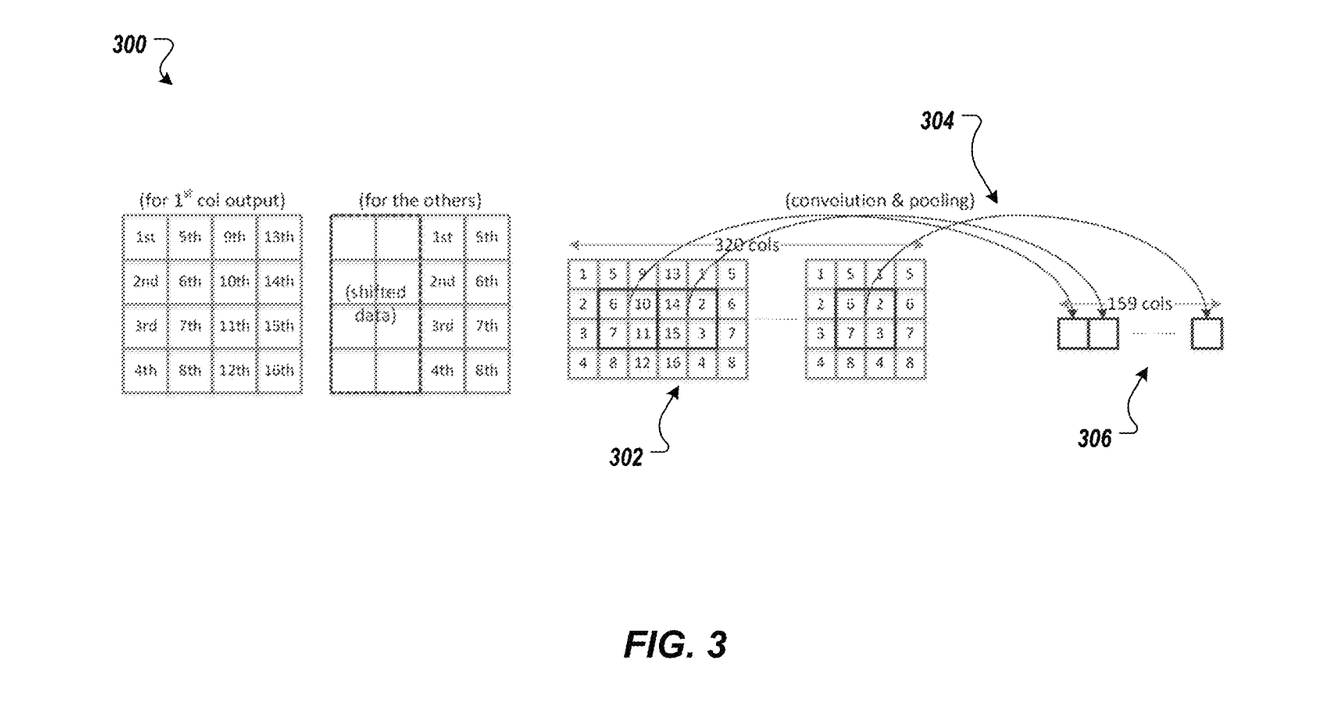
FIG. 3 is a schematic depicting an example of a conventional convolution and pooling scheme, according to implementations of the present disclosure.

FIG. 3 is a schematic 300 depicting an example of a conventional convolution and pooling scheme. FIG. 3 describes an operation clock cycle corresponding to the algorithm described with reference to FIG. 2, which may require 16 clocks for the first column output after the convolution and pooling process, and which may require 8 clocks for the other column outputs.

As shown in FIG. 3, the 3×3 window of analysis may be applied to different portions of the image 302 during a particular layer of convolution and pooling 304, to generate a convolution output 306. A 3×3 kernel (e.g., weight) may be overlaid and the kernel may be multiplied by the data for the particular portion of pixels, to output a particular value. This value may then be compared to other output values to determine the maximum, and the portion exhibiting the maximum may be further analyzed in subsequent layers.

Convolution and pooling may be performed at the various layers of analysis for a particular kernel size, with regard to one or more channels of input and/or output. The various convolution and pooling results for various layers may be stacked on top of one another to form a deep neural network hierarchy. Traversing from the low level to the higher level may include convolution and/or various non-linear operation(s) to determine a higher level (e.g., more abstract) representation of the image as the analysis progresses deeper. For example, a first layer of analysis may identify edges in an image, subsequent layer(s) may combined the edges to identify shapes or other features within the image, the shapes may be combined at further higher level(s), and so forth to determine what is shown in the image.

Figure 4:
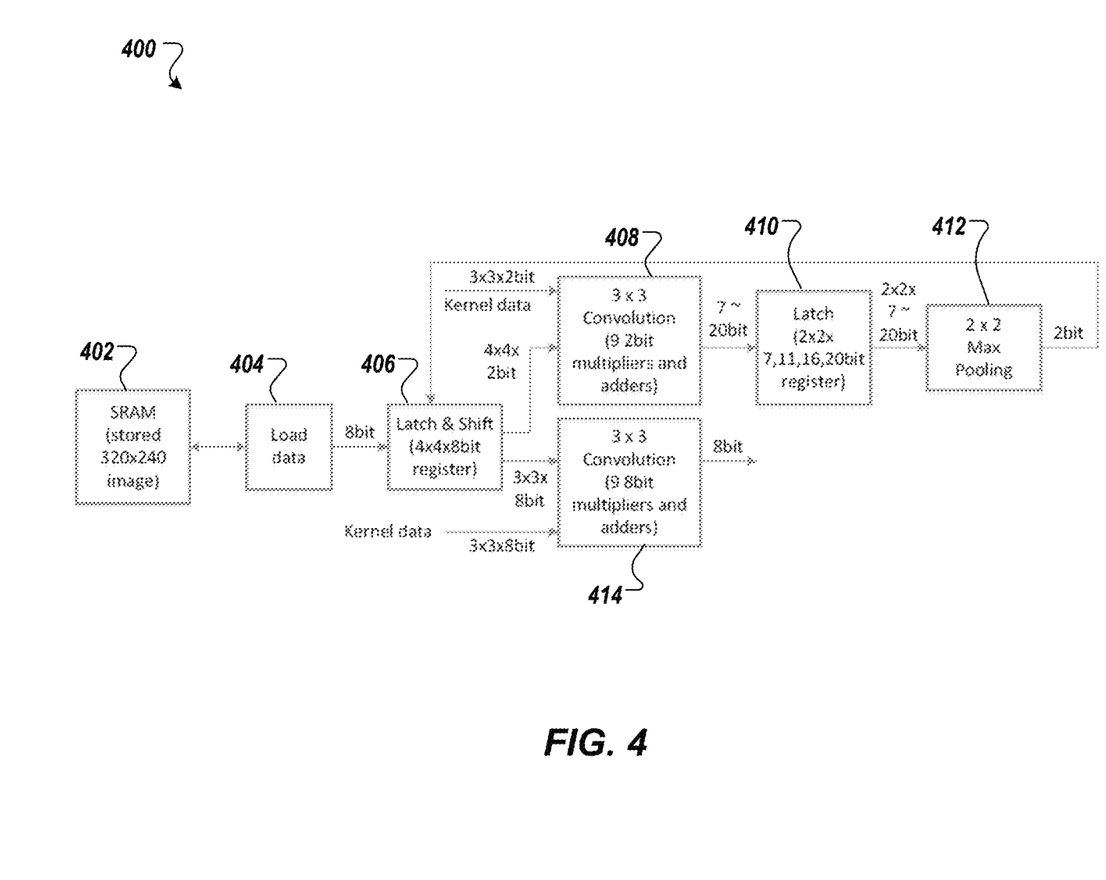
FIG. 4 is a flow diagram depicting an example process for convolution and pooling, according to implementations of the present disclosure.

FIG. 4 is a flow diagram 400 depicting an example process for convolution and pooling, according to implementations of the present disclosure. FIG. 4 shows an example of a flow diagram, e.g., logic and/or block diagram, for a convolution and pooling scheme that employs 3×3 convolution, 2×2 pooling, and 8-bit precision.

An image (e.g., 320×240) may be stored (402) (e.g., in SRAM) and the data of the image loaded (404) into registers (406) for processing.

Using the two most significant bits of image data and convolution kernel, approximate multiply-and-add operations are performed (408). The intermediate approximate results are stored into registers (410), and 2×2 max-pooling is performed on the approximate 2-bit multiply-and-add results (412). The output of the pooling computation is fed back to the input data registers (406), which govern the following computations.

As shown in the example of FIG. 4, 2×2 max pooling may be performed and, based on whether a maximum was found or not, the process may iterate. If a maximum is found, the 3×3 convolution may be performed and full precision convolution may be performed on the maximum-exhibiting data set (414). If a maximum is not found, then the next group of (e.g., higher precision) bits may be retrieved and used to compute results (408) in the next iteration, with any suitable number of iterations performed until a maximum is found.

The scheme of FIG. 4 may proceed according to the intermediate convolution equation below, Example Equation 2.

$$= \sum_{i=0}^{itr-1} \sum_{n=1}^{M \times N} 4^{itr-1-i} D[MSB - 2 \times i:MSB - 2 \times i - 1]_n$$

$$K[MSB - 2 \times i:MSB - 2 \times i - 1]_n \quad (itr: \text{\#iteration})$$

Example Equation 2

Example Equations 3, 4, and 5 illustrate the first, second, and third iterations respectively, for 8-bit precision and 3×3 convolution.

$$= \sum_{n=1}^{9} D[7:6]_n K[7:6]_n$$

Example Equation 3

$$= \left(\sum_{n=1}^{9} D[7:6]_n K[7:6]_n\right) \times 4 + \sum_{n=1}^{9} D[5:4]_n K[5:4]_n$$

Example Equation 4

$$= \left(\sum_{n=1}^{9} D[7:6]_n K[7:6]_n\right) \times 16 +$$

$$\left(\sum_{n=1}^{9} D[5:4]_n K[5:4]_n\right) \times 4 + \sum_{n=1}^{9} D[3:2]_n K[3:2]_n$$

Example Equation 5

For the example equations 2-5, the left hand side of the equation may be the output convolution pixel value. Although examples herein describe using the cascading (e.g., iterative) CNNs for image analysis, implementations may also be applied in other data analysis scenarios.

Figure 5:
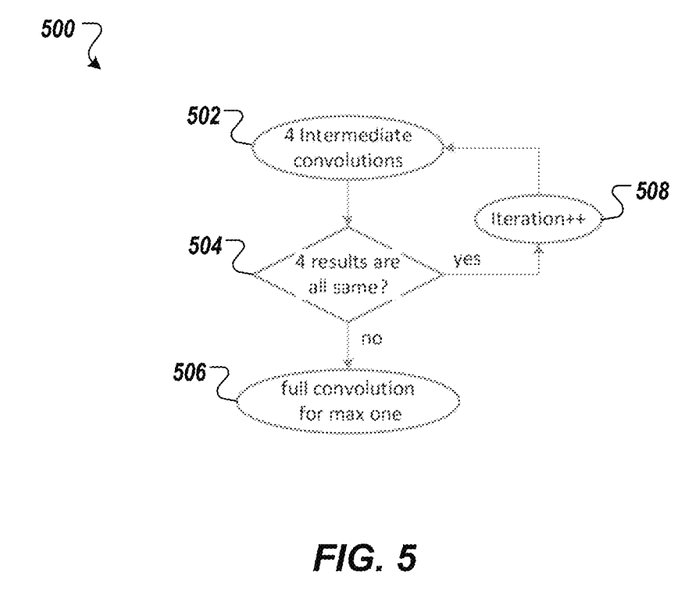
FIG. 5 is a flow diagram depicting an example process for convolution and pooling, according to implementations of the present disclosure.

FIG. 5 is a flow diagram 500 depicting an example process for convolution and pooling, according to implementations of the present disclosure. For a 2×2 pooling, four intermediate (e.g., approximate) convolutions may be performed (502) and the results of the four convolutions may be examined (504) to determine whether any of the convolutions exhibit a maximum, or whether the four results are the same. If the four results are the same, or sufficiently similar (e.g., within a predetermined threshold range of one another), the process may perform (508) another iteration (e.g., cascade) as described above, performing a convolution using more bits of data. If the four results are not the same and/or are not similar (e.g., if a clear maximum is exhibited by one of the convolutions), the analysis may proceed (506) to perform the full (e.g., full precision) convolution for the data set that exhibited the maximum of the low precision, MSB-based convolution.

Figure 6:
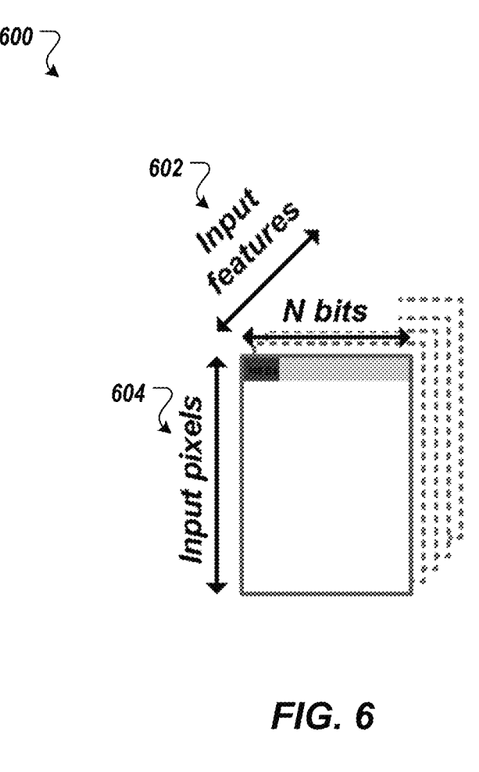
FIG. 6 is a schematic depicting an example architecture, according to implementations of the present disclosure.

FIG. 6 is a schematic 600 depicting an example arrangement of input data, according to implementations of the present disclosure. As shown in the example of FIG. 6, the MSBs of various input features 602 may be loaded first, instead of loading the full precision input as in conventional schemes. In some implementations, the input data may include a plurality of input features 602, which may also be described as input channels. Each input feature 602 may include an array of input pixels 604. For example, for a data set of 100×100 pixels, there may be multiple layers as each pixel includes N bits. As a particular example, the different channels may be different color channels (e.g., three color dimensions for a RGB color format image). In some implementations, the result values for the same pixel may be added across different channels.

Figure 7:
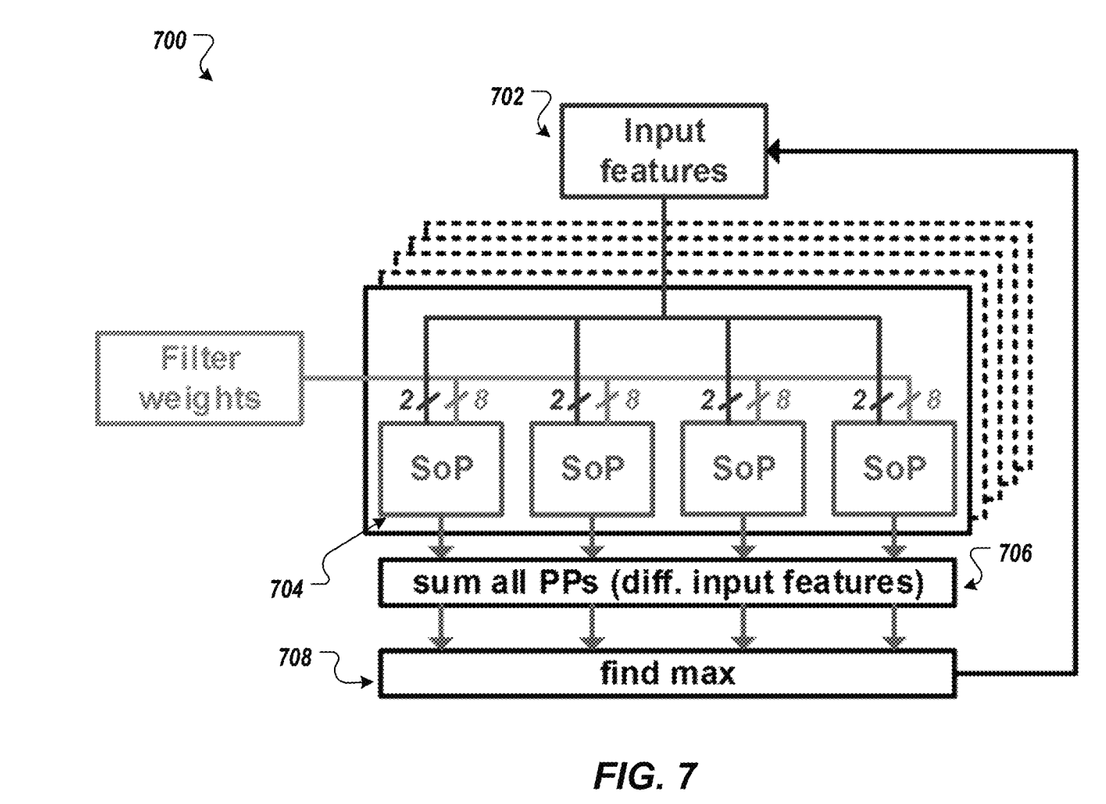
FIG. 7 is a schematic depicting an example architecture, according to implementations of the present disclosure.
Figure 8:
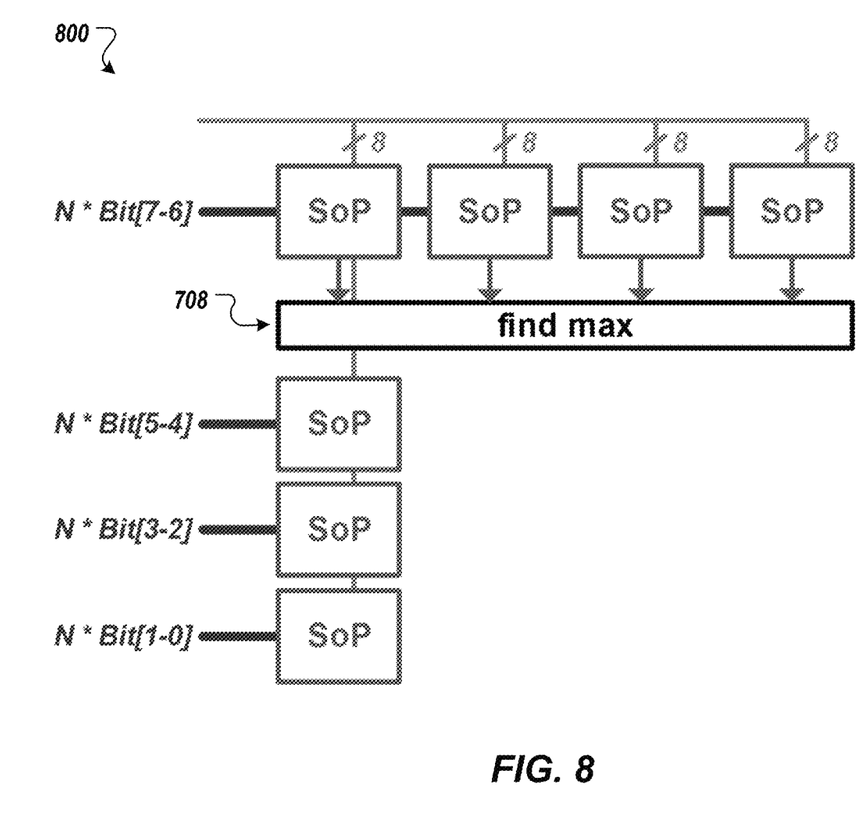
FIG. 8 is a schematic depicting an example architecture, according to implementations of the present disclosure.

FIGS. 7 and 8 are schematics 700 and 800 respectively depicting an example architecture, according to implementations of the present disclosure. FIG. 7 shows the various input features or channels that may be present in some instances. For each input feature 702, implementations may process two bits at a time and the two bits may be multiplied by the 8 bits of weight data by a SoP module 704, e.g., a sum-or-product or multiply-and-add module. Each SoP 704 may accumulate the various multiplication results from different channels, and the partial products (PPs) may be summed (706) for the different input features or channels. The maximum may be identified (708) among these various (e.g., four) results. As shown in FIG. 8, if a maximum is found (708) a full precision calculation may be performed for the data set that exhibited the maximum value. If not, then higher precision calculations may be performed until a maximum is identified, as described above. After the maximum value is found, the same SoP modules that were used in the computation with most significant bits of data can be re-used for computation of the less significant bits of data, thus maximizing hardware utilization.

Table 1 below shows test results of using the implementations described herein to analyze two test images, image1 and image2, compared to the results of using conventional techniques. For the tests described below, the input data is 320×240×3, the convolution kernel is 7×7×3, the pooling window is 2×2, the width of input and kernel data is 8 bit and 12 bit respectively, the maximum frequency is 500 MHz, and an 8×3-bit multiplier is used for the tests using the implementations described herein.

TABLE 1

| | Conventional techniques | Implementations described herein |
|---|---|---|
| Power (mW) | 92.8 [1], 88.6 [2] | 44.1 [1], 41.8 [2] |
| Total delay (ns) | 629,145 | 746,150 [1], 752,770 [2] |
| Energy (J) | 58.384 × 10$^{-9}$ [1], 55.742 × 10$^{-9}$ [2] | 32.905 × 10$^{-9}$ [1], 31.466 × 10$^{-9}$ [2] |
| Total cell area | 687,876 | 222,784 |
| Difference average | | 0.0042 [1], 0.0073 [2] |
| Difference maximum | | 3 [1], 6 [2] |

In Table 1, the 1 superscript refers to the results of using image1 for input data, and the 2 superscript refers to the results of using image2 for input data. The number of iterations performed may be dependent on the image being processed. On average, the use of the implementations described herein may results in a power reduction of greater than a factor of two. Table 2 below shows a distribution of the number of iterations for processing image1 and image 2.

TABLE 2

|  | Image1 | Image2 |
| --- | --- | --- |
| 1 iteration | 18,368 (100%) | 17,261 (94%) |
| 2 iterations | 0 (0%) | 0 (0%) |
| 3 iterations | 0 (0%) | 0 (0%) |
| 4 iterations | 1 (0%) | 1,108 (6%) |

Table 3 below describes test results using a second layer of AlexNet for particular test image, comparing results achieved using implementations described herein versus conventional techniques. For the tests described below, the input data is 55×55×48, the convolution kernel is 5×5×48, the pooling window is 2×2, the width of input and kernel data is 12 bit, the maximum frequency is 455 MHz and 500 MHz for the conventional techniques and implementations described herein respectively, and 12×3-bit multiplier is used for the tests using the implementations described herein.

TABLE 3

|  | Conventional techniques | Implementations described herein |
| --- | --- | --- |
| Logic power (mW) | 84.8 | 37.8 |
| SRAM power (mW) | 136.1 | 94.4 |
| Total power (mW) | 220.9 | 132.2 |
| Total delay (ns) | 594,132 | 971,939 |
| Total cell area (um$^2$) | 634,601 | 203,939 |
| Difference average |  | 0.31 |
| Difference maximum |  | 4 |

Table 4 below shows a distribution of the number of iterations for processing the test image.

TABLE 4

|  | Image |
| --- | --- |
| 1 iteration | 567 (91%) |
| 2 iterations | 58 (9%) |
| 3 iterations | 0 (0%) |
| 4 iterations | 0 (0%) |

As shown in Table 4, 91% of the approximate computations found a maximum in the first iteration, using the implementations described herein. For 2×2 pooling, 91% of 3 (out of 4) outputs did not reach a second, third, or fourth iteration. The test results of Tables 1-4 indicate that implementations of the cascading CNNs described herein provide for CNNs that identify a maximum with high likelihood in the first or second iteration, thus avoiding subsequent iterations and foregoing redundant calculations present in conventions CNNs. The Tables 1-4 also illustrate that implementations provide for lower power consumption and/or energy consumption compared to conventional techniques, as well as other advantages.

Although various examples herein describe using implementations for image analysis, implementations are not limited to this particular application. Implementations may also use the cascading CNNs described herein for other applications, such as in speech analysis, biomedical applications, and so forth.

Figure 9:
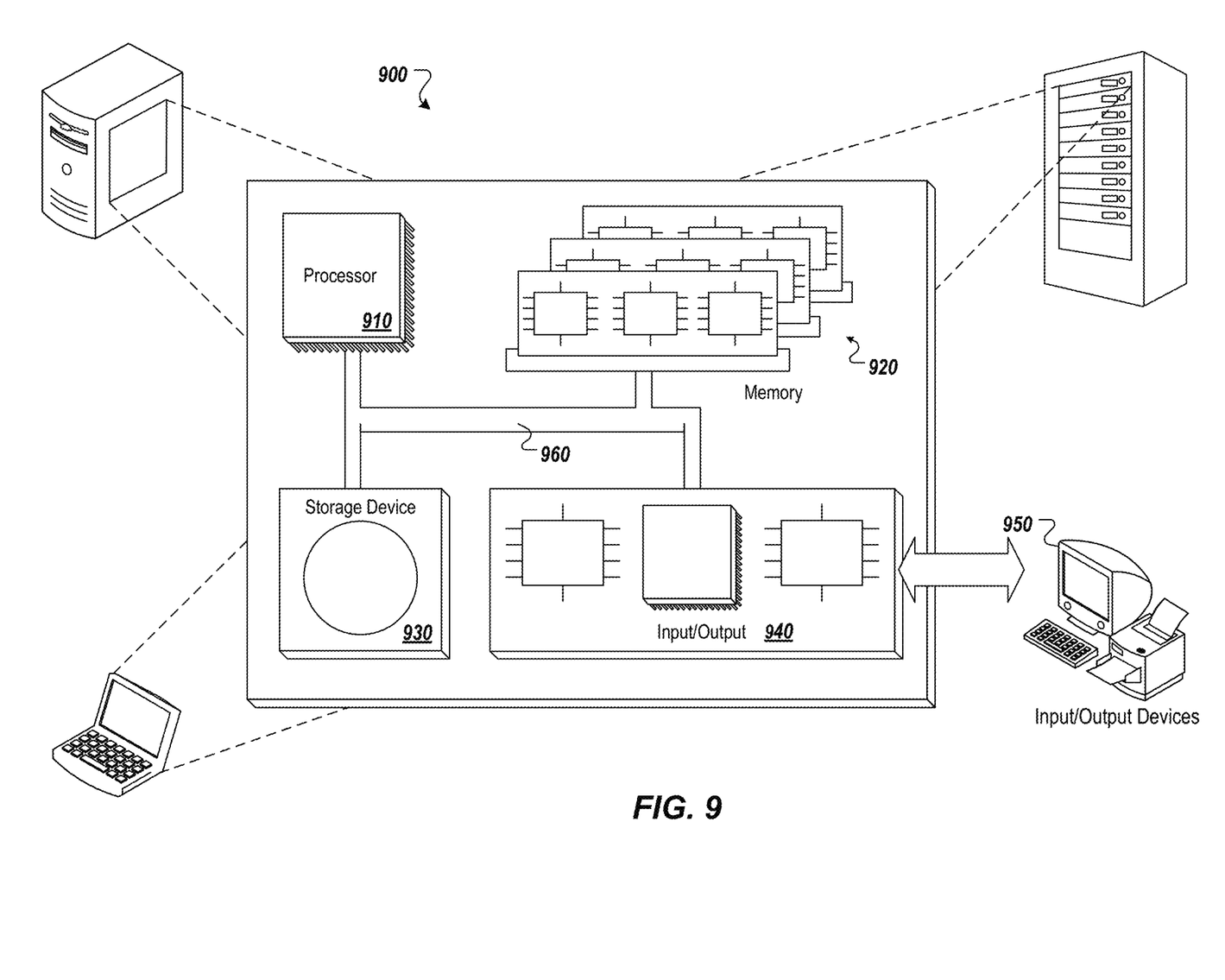
FIG. 9 depicts an example computing system, according to implementations of the present disclosure.

FIG. 9 depicts an example computing system, according to implementations of the present disclosure. The system 900 may be used, in whole or in part, for any of the operations described with respect to the various implementations discussed herein. The system 900 may include one or more processors 910, a memory 920, one or more storage devices 930, and one or more input/output (I/O) devices 950 controllable through one or more I/O interfaces 940. The various components 910, 920, 930, 940, or 950 may be interconnected through at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any number of volatile memory units, any number of non-volatile memory units, or both volatile and non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more networks using any network protocol.

Computing devices of the system 900 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other. The computing system may also include any number of peers which may be distributed and/or remote from one another. The peers may enter into peer-to-peer relationships and establish peer-to-peer connections for communications.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. One or more non-transitory computer-readable storage media storing instructions which, when executed by at least one processor, cause the at least one processor to perform operations comprising:
   in one or more layers of a convolutional neural network (CNN), performing a first iteration that includes computing a value based on a first set of most significant bits (MSBs) for each of a plurality of data sets;
   examining a first set of values computed for the plurality of data sets in the first iteration to determine whether a maximum value is present among the first set of values;
   responsive to identifying the maximum value, performing a full precision computation of the value for a data set, of the plurality of data sets, that exhibited the maximum value; and
   propagating the full precision computation of the value to a subsequent layer of the CNN.

2. The one or more non-transitory computer-readable storage media of claim 1, further comprising:
   responsive to determining that the first set of values are the same, performing, by the at least one processor, a second iteration that includes computing the value based on a second set of MSBs for each of the plurality of data sets, the second set of MSBs being larger than the first set of MSBs.

3. The one or more non-transitory computer-readable storage media of claim 2, further storing instructions, which, when executed by the at least one processor, cause the at least one processor to perform operations comprising:
   examining a second set of values computed for the plurality of data sets in the second iteration to determine whether the maximum value is present among the second set of values; and
   responsive to identifying the maximum value among the second set of values, performing, by the at least one processor, the full precision computation of the value for a data set, of the plurality of data sets, that exhibited the maximum value in the second iteration.

4. The one or more non-transitory computer-readable storage media of claim 2, wherein the computing in each of the first iteration and the second iteration employs a convolution and a pooling.

5. The one or more non-transitory computer-readable storage media of claim 4, wherein the convolution is a N×N convolution, where N is any integer.

6. The one or more non-transitory computer-readable storage media of claim 4, wherein the pooling is a N×N pooling, where N is any integer.

7. The one or more non-transitory computer-readable storage media of claim 4, wherein the convolution is a 3×3 convolution, and the pooling is a 2×2 pooling.

8. The one or more non-transitory computer-readable storage media of claim 2, wherein at least one of the first iteration and the second iteration is performed with a precision less than that of the full precision computation.

9. The one or more non-transitory computer-readable storage media of claim 8, wherein the precision is 8-bit precision.

10. The one or more non-transitory computer-readable storage media of claim 1, wherein the CNN is employed to analyze an image.

11. The one or more non-transitory computer-readable storage media of claim 1, wherein:
the first iteration computes a value that approximates the full precision computation of the value; and
the full precision computation is performed on the data set that includes less data than the plurality of data sets.

* * * * *